Dec. 1, 1959     J. KRUSCHIK     2,915,087
VALVES
Filed July 2, 1954     2 Sheets-Sheet 1
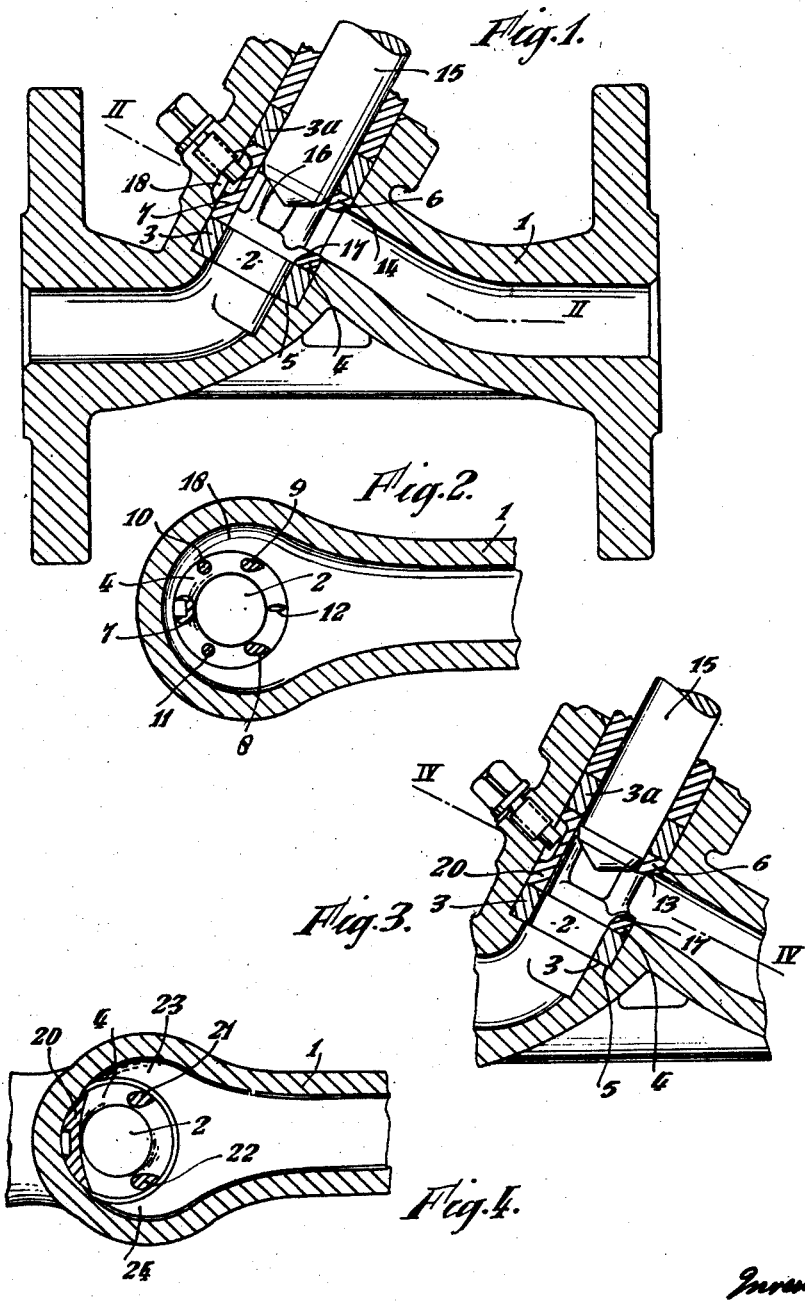

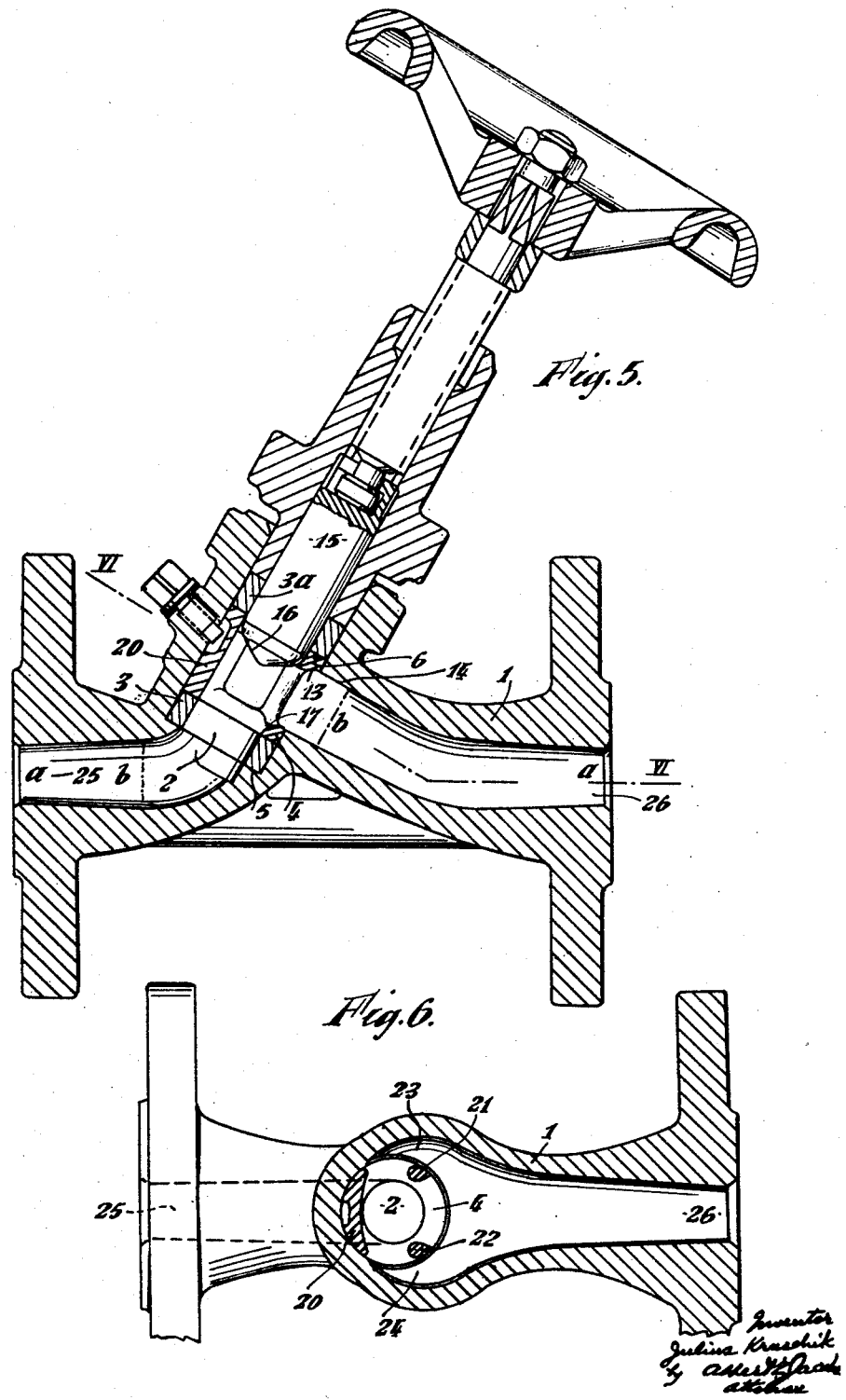

United States Patent Office 2,915,087
Patented Dec. 1, 1959

2,915,087

VALVES

Julius Kruschik, Vienna, Austria, assignor to Rich. Klinger Aktiengesellschaft, Vienna, Austria, a body corporate of Austria Application July 2, 1954, Serial No. 440,958

Claims priority, application Austria July 24, 1953

1 Claim. (Cl. 137—625.37)

The invention relates to an improved shut-off member for valves, such as piston valves, sluice valves, stop cocks and the like of the kind consisting of a valve housing providing a throughflow passage, a packing and a movable shut-off member, the object of the invention being to provide improvements in the construction of the shut-off member thereof from the viewpoint of flow technique.

Piston valves, with which the invention is primarily concerned, usually consist of a valve housing having an inlet duct and an outlet duct, and a passage situated therebetween, into which the shut-off member is introduced. In known constructions, the throughflow passage is shaped to give a substantially S-form to the path of the flowing medium or pressure medium which is deflected by a baffle when the valve is in the open position. The sealing in the closed position of the valve is effected by two packing rings held apart by a spacer and disposed between the wall of the housing and the piston. The spacer generally consists of two rings and six supporting cross members. Situated between the cross members are apertures, through which the liquid flows after deflection. In an equivalent construction used with shut-off members, the packing rings are held apart by a sleeve having apertures for the passage of the flowing medium or pressure medium.

It will be appreciated that the construction of the spacing device for holding the packing rings apart and providing the outlet apertures for the passage of the flowing medium is of major importance in determining the resistance to flow of the shut-off member, since these parts lie directly in the path of the liquid. The existing constructions have not proved satisfactory, because insufficient consideration has been given to flow conditions. The two rings and the six supporting cross members of the spacer are flat and angular, and thus promote eddying and cause a pressure drop in the duct.

In contrast thereto, the invention concerns a shut-off member comprising a seal formed of packing rings and a movable shut-off member, the said seal being provided with an apertured device for holding the packing rings apart, which comprises at most four main supporting cross members of profiled cross-section to conform to the course of the flow and preferably have a peardrop shaped streamlined cross-sections. In addition to the main supporting cross members, auxiliary cross members of substantially smaller and also of rounded cross-section may be provided between the main supporting cross members. In the case of piston valves, a spacer having three main supporting cross members is preferred, one of the said cross members being arranged on the side of the valve opposite the outlet duct and the other two being arranged laterally thereof, so that the cross members form the corners of an equilateral triangle. Preferably, not only the cross-sections of all the cross members, but also the upper and lower edges of the outlet apertures of the spacer are shaped to conform to the course of the flow. The upper edge is for this purpose bevelled outwardly and upwardly, while the lower edge is rounded from the inside towards the outside. In addition, a very favourable construction is obtained if the rear supporting cross member lying opposite the outlet duct is widened, preferably to an extent of about 120° of the cross-section of the spacer, so that the spacer is completely closed over this area. Preferably, the valve housing in this case is provided with two lateral pockets, into which the inner face of the widened supporting cross member merges gradually. With this construction, particularly favourable flow conditions are created.

Embodiments of the invention are illustrated by way of example in the accompanying drawings.

Figure 1 shows in longitudinal vertical sections part of a piston valve provided with a spacer according to the invention having three main supporting cross members and three auxiliary supporting cross members.

Figure 2 is a horizontal section along the line II—II of Figure 1,

Figure 3 shows a spacer having a widened rear cross member,

Figure 4 is a horizontal section along the line IV—IV of Figure 3, and

Figures 5 and 6 illustrate in vertical longitudinal section a complete valve having a spacer according to Figures 3 and 4 respectively.

Disposed in a valve housing 1 having a passage 2 is a lower packing ring 3, which is pressed against a bearing surface 5 formed by a shoulder in the housing by the lower ring 4 of a spacer. The spacer itself consists of the lower ring 4 and an upper ring 6, connected by the three main supporting cross members 7, 8 and 9. The cross member 7 is at the rear and disposed opposite the outlet duct, while the two cross members 8 and 9 are at the front, each disposed at 120° therefrom, so that the cross members occupy the corner points of an equilateral triangle. Situated between the main supporting cross members are auxiliary cross members 10, 11 and 12, which are of substantially smaller cross-section than the main cross members. All the cross members have a rounded cross-section adapted to the course of the flow, the forward cross members 8, 9 and 12 being preferably designed with streamlined peardrop shaped cross-section. An annular recess, the so-called annular chamber 18, is provided in the wall of the housing and surrounds the spacer.

The upper and lower rings of the spacer are also shaped to conform to the course of the flow, the upper ring having on the outlet side of the valve an upwardly and outwardly bevelled surface 13 merging gradually into the wall 14 of the housing. The shut-off member 15 preferably has a conical deflecting surface 16 which gradually merges into the bevelled surface 13 of the upper ring 6, as shown, when the valve is in the open position, so that no obstacle is placed in the flow. The lower ring 4 of the spacer has on the outlet side a surface 17 rounded from the inside towards the outside, which also conforms substantially to the course of the flow.

Figures 3 and 4 show a construction of a spacer which conforms to the course of the flow to an even greater extent than the previously described construction and in which the throughflow resistance is reduced to a minimum. The spacer again comprises three main supporting cross members 20, 21 and 22, which hold the packing rings 3 and 3a apart. The cross member 20 situated at the rear and opposite the outlet aperture is widened over 120° of the diameter of the spacer, so that the rear side of the spacer is closed off. The cross-section of the cross member 20 is crescent-shaped with the inner face of the cross member merging gradually into two lateral pocket-like extensions 23, 24 formed in the wall of the housing. In this constructional form, the lateral pockets 23 and 24 are provided, instead of an annular chamber as hitherto, whereby particularly favourable flow conditions are created. The front cross members 21 and 22 have streamlined cross-section, as in the example illustrated in Figures 1 and 2, the upper and lower rings of the spacer being also bevelled and rounded as before.

A further development of the invention is illustrated in Figures 5 and 6. It has been found that the best results are obtained if the spacer asymmetrical transversely in relation to the direction of flow is combined with a valve housing construction which has a flow through passage of larger diameter than the diameter of inlet and outlet where the pipes are connected. In this case, the danger of eddying and deflection losses are even further reduced by a reduction in the speed of flow. The pipe connecting parts 25, 26 have a diameter $a$. The preferably straight, inlet passage widens in the manner of a diffusor to a cross-section $b$, at which point the S-shaped curvature of the throughflow passage commences. The increase in cross-section in the diffusor at $b$ amounts preferably to 10–30% with respect to $a$ and is retained in the valve passage as far as the beginning of the outlet duct after the deflection. From here, the outlet gradually narrows as far as the pipe connecting part, at which the cross-section $a$ is again reached. An asymmetrical spacer having three main cross members, of which the rear one is widened over about 120°, is provided in the housing in combination with lateral housing pockets in a form analogous to that illustrated in Figures 3 and 4.

The invention is not limited to piston valves having seals consisting of packing rings and a spacer, but the features described may also be applied to sluice valves and two-way cocks, in which applications a considerable improvement in flow technique is also obtained.

What I claim and desire to secure by Letters Patent is:

A fluid flow control valve comprising a valve housing having an inlet duct and an outlet duct in direct and angular communication therewith and forming with the inlet duct a continuous S-shaped throughflow passage in the housing and a movable shut-off member having a piston disposed at the juncture of said ducts and having a conical end surface for flow deflection to the outlet duct in the open position of the valve, upper and lower spaced resilient packing rings mounted in the housing and through which the piston moves and a lantern-type spacer in the valve housing for maintaining said packing rings in spaced relationship under pressure, the said spacer being composed of upper and lower spacer rings connected by less than four annularly spaced, triangularly disposed supporting cross members whose cross-sections are teardrop-shaped and rounded and streamlined in the direction of fluid flow through the housing, the said upper spacer ring being provided on its underside with a beveled surface inclined upwardly and outwardly in the direction of fluid flow through the housing and merging gradually into the housing wall and the said lower spacer ring having on its outlet side a surface rounded from the inside to the outside and also conforming substantially to the direction of fluid flow.

References Cited in the file of this patent

UNITED STATES PATENTS

| | | |
|---|---|---|
| 1,014,178 | Roberts | Jan. 9, 1912 |
| 1,457,318 | Shevlin | Jan. 5, 1923 |
| 1,511,302 | Schnetzer | Oct. 14, 1924 |
| 2,192,425 | Allen | Mar. 5, 1940 |
| 2,598,187 | Meyer | May 27, 1952 |
| 2,621,483 | Kalix | Dec. 16, 1952 |
| 2,685,426 | MacGregor | Aug. 3, 1954 |

FOREIGN PATENTS

| | | |
|---|---|---|
| 308,193 | Great Britain | of 1930 |
| 299,608 | Italy | Aug. 9, 1932 |
| 732,649 | France | of 1932 |
| 887,897 | Germany | of 1953 |